(12) United States Patent
Meighu et al.

(10) Patent No.: US 11,941,589 B2
(45) Date of Patent: Mar. 26, 2024

(54) SYSTEM AND METHOD FOR ASSOCIATING A SUCCESSFUL SECOND TRANSACTION WITH A FIRST FAILED TRANSACTION

(71) Applicant: SHOPIFY INC., Ottawa (CA)

(72) Inventors: Kai-Yanna Meighu, Ottawa (CA); Hettige Ray Perera Jayatunga, Toronto (CA)

(73) Assignee: SHOPIFY INC.

( * ) Notice: Subject to any disclaimer, the term of this patent is extended or adjusted under 35 U.S.C. 154(b) by 140 days.

(21) Appl. No.: 17/711,151

(22) Filed: Apr. 1, 2022

(65) Prior Publication Data

US 2023/0316239 A1 Oct. 5, 2023

(51) Int. Cl.
*G06Q 30/00* (2023.01)
*G06Q 20/02* (2012.01)
*G06Q 30/0601* (2023.01)

(52) U.S. Cl.
CPC ......... *G06Q 20/02* (2013.01); *G06Q 30/0633* (2013.01); *G06Q 30/0641* (2013.01)

(58) Field of Classification Search
CPC .................................................... G06Q 30/00
See application file for complete search history.

(56) References Cited

U.S. PATENT DOCUMENTS

| | | | | |
|---|---|---|---|---|
| 10,672,005 | B1 * | 6/2020 | Hart | G06Q 20/4016 |
| 10,769,130 | B1 * | 9/2020 | Armbrust | G06F 16/148 |
| 11,538,037 | B2 * | 12/2022 | Hart | G06Q 20/401 |
| 2020/0304326 | A1 * | 9/2020 | Xie | G06F 21/554 |
| 2021/0133702 | A1 * | 5/2021 | Liu | G06Q 40/12 |

OTHER PUBLICATIONS

Oracle, "XA and Oracle controlled Distributed Transactions" Oracle White Paper, dated Jun. 2010. (Year: 2010).*
Affirm, "How our Direct API integration works", https://docs.affirm.com/developers/docs/direct-api-overview, 6 pages [Retrieved May 4, 2022].

* cited by examiner

*Primary Examiner* — Mark A Fadok

(57) ABSTRACT

Systems and methods for processing transactions are provided. An aspect of the transactions is executed with a third party transaction service provider that may indicate its aspect of the transaction was a failure when in fact it was successful. After conveying this failure to a user, the system subsequently learns that the aspect of the transaction was not a failure. The system attempts to associate such a transaction with another transaction based on a comparison between the transactions. Upon determining that there is an association between the second transaction and the first transaction, the system communicates to a user options for how to proceed with the first and second transactions. One of the options is to proceed with the original transaction. If the original transaction goes ahead, this saves system resources associated with cancelling the first transaction.

20 Claims, 8 Drawing Sheets

E-Commerce Platform | Search | JG John's Apparel / Jonny B. Good

- Home
- Orders
- Products
- Customers
- Reports
- Discounts
- Apps

SALES CHANNELS ⊕
- Online Store
- Mobile App

View all channels

⚙ Settings

Good afternoon, Jonny B..
Here's what's happening with your store today.

Today's total sales  Today's visits
$98.00             1

● Update your Platform Payments tax details
We require additional information to verify your identity.
[Update tax details]

● Advanced Cash on Delivery has been deactivated for your store
[See why]

All channels ˅    Today ˅

TOTAL SALES
$98.00

$125
$75
$25
         12am    8pm    4pm    11pm
                              Jun 1
                              2 orders TOTAL SALES BY CHANNEL    View dashboard
Online Store                       Jun 1
$0.00                          0 orders Mobile app
$0.00                          0 orders Shopify POS (126 York St.)
$0.00                          0 orders

FIG. 6

SYSTEM AND METHOD FOR ASSOCIATING A SUCCESSFUL SECOND TRANSACTION WITH A FIRST FAILED TRANSACTION

TECHNICAL FIELD

The application relates to systems that perform distributed transaction processing, in which at least an aspect of a transaction is executed on a distinct system component, such as with a third party transaction service provider.

BACKGROUND

In distributed transaction processing, different aspects of a transaction can be implemented/processed in distinct system components that communicate with each other, typically over a network. Due to the distributed nature of the system, not all system components necessarily have an accurate view of the transaction at any given instant. For example, one or more of the system components may be provided by third party providers. The result is the possibility of a broken transaction flow. In a specific example, a third party provider that is relied upon for an aspect of the transaction may indicate that its aspect of the transaction was unsuccessful, when in fact it was successful. Alternatively, the aspect could succeed but then timeout, or succeed following by a request being dropped. The third party provider may later go on to indicate that its aspect of the transaction was successful, but it may be too late, as a user involved in the original transaction may have moved on. In this case, it is necessary for the original transaction to be completely reversed, unnecessarily occupying resources of the distributed processing system.

SUMMARY

Systems and methods for processing transactions are provided. An aspect of the transactions is executed with a third party transaction service provider that may indicate its aspect of the transaction was a failure when in fact it was successful. After conveying this failure to a user, the system subsequently learns that the aspect of the transaction was not a failure. The system attempts to associate such a transaction with another transaction based on a comparison between the transactions. Upon determining that there is an association between the second transaction and the first transaction, the system communicates to a user options for how to proceed with the first and second transactions. One of the options is to proceed with the original transaction. If the original transaction goes ahead, this saves system resources associated with cancelling the first transaction.

According to one aspect of the present invention, there is provided a processor implemented method comprising: in response to input from a user via a graphical interface in respect of a first transaction, attempting to execute an aspect of the first transaction with a third party transaction service provider; generating a failed transaction indication to the user via the graphical user interface based on an indication from the third party transaction service provider that the aspect of the transaction was unsuccessful; obtaining an indication that the aspect of the transaction was successful; determining whether there is an association between the first transaction and a second transaction based on a comparison between the first transaction and the second transaction; and upon determining that there is an association between the second transaction and the first transaction, communicating to the user at least two options for how to proceed with the first and second transactions, the at least two options including at least one of: an option to proceed with the second transaction and cancel the first transaction; an option to proceed with the first transaction in place of the second transaction; or an option to proceed with the second transaction or a part of the second transaction in place of part of the first transaction.

In some embodiments, obtaining an indication that the aspect of the transaction was in fact successful comprises receiving a web-hook from which it can be determined that the aspect of the transaction was in fact successful.

In some embodiments, obtaining an indication that the aspect of the transaction was in fact successful comprises performing a reconciliation process.

In some embodiments, the input from a user via a graphical interface in respect of a first transaction comprises input to an e-commerce shop, and wherein attempting to execute an aspect of the first transaction by engaging a third party transaction service provider comprises engaging a third party installment payment service provider.

In some embodiments, determining whether there is an association between the first transaction and the second transaction based on a comparison between the first transaction and the second transaction comprises determining whether a product in an online shopping cart for the first transaction has a same function or a similar function as a product in an online shopping cart for the second transaction.

In some embodiments, communicating to the user at least two options for how to proceed with the first and second transactions comprises communicating the options to the user via the graphical user interface before the user has completed the second transaction.

In some embodiments, determining that the aspect of the transaction was in fact successful comprises performing a per-transaction reconciliation after each transaction.

In some embodiments, communicating to the user at least two options for how to proceed with the first and second transactions comprises communicating the options to the user via an email or another messaging platform that is independent of the graphical user interface.

In some embodiments, the method further comprises: prior to communicating the at least two options to the user, communicating the options to a merchant account associated with the online shop, for confirmation or adjustment.

According to another aspect of the present invention, there is provided a system for processing transactions, the system comprising: memory including item listing information and information identifying users; a processor configured control the system to: in response to input from a user via a graphical interface in respect of a first transaction, attempt to execute an aspect of the first transaction with a third party transaction service provider; generate a failed transaction indication to the user via the graphical user interface based on an indication from the third party transaction service provider that the aspect of the transaction was unsuccessful; obtain an indication that the aspect of the transaction was successful; determine whether there is an association between the first transaction and a second transaction based on a comparison between the first transaction and the second transaction; and responsive to determining that there is an association between the second transaction and the first transaction, communicate to the user at least two options for how to proceed with the first and second transactions, the at least two options including at least one of: an option to proceed with the second transaction and cancel the first transaction; an option to proceed with the first transaction in place of the second transaction; or an option to proceed with the second transaction or a part of the second transaction in place of part of the first transaction.

In some embodiments, obtaining an indication that the aspect of the transaction was in fact successful comprises receiving a web-hook from which it can be determined that the aspect of the transaction was in fact successful.

In some embodiments, obtaining an indication that the aspect of the transaction was in fact successful comprises performing a reconciliation process.

In some embodiments, the input from a user via a graphical interface in respect of a first transaction comprises input to an e-commerce shop, and wherein attempting to execute an aspect of the first transaction by engaging a third party transaction service provider comprises engaging a third party installment payment service provider.

In some embodiments, determining whether there is an association between the first transaction and the second transaction based on a comparison between the first transaction and the second transaction comprises determining whether a product in an online shopping cart for the first transaction has a same function or a similar function as a product in an online shopping cart for the second transaction.

In some embodiments, wherein communicating to the user at least two options for how to proceed with the first and second transactions comprises communicating the options to the user via the graphical user interface before the user has completed the second transaction.

In some embodiments, wherein determining that the aspect of the transaction was in fact successful comprises performing a per-transaction reconciliation after each transaction.

In some embodiments, communicating to the user at least two options for how to proceed with the first and second transactions comprises communicating the options to the user via an email or another messaging platform that is independent of the graphical user interface.

In some embodiments, the system of further comprises: prior to communicating the at least two options to the user, communicating the options to a merchant account associated with the online shop, for confirmation or adjustment.

According to another aspect of the present invention, there is provided a non-transitory computer readable medium including processor executable instructions which, when executed by a processor cause the processor to control a system to: in response to input from a user via a graphical interface in respect of a first transaction, attempt to execute an aspect of the first transaction with a third party transaction service provider; generate a failed transaction indication to the user via the graphical user interface based on an indication from the third party transaction service provider that the aspect of the transaction was unsuccessful; obtain an indication that the aspect of the transaction was successful; determine whether there is an association between the first transaction and a second transaction based on a comparison between the first transaction and the second transaction; and responsive to that there is an association between the second transaction and the first transaction, communicate to the user at least two options for how to proceed with the first and second transactions, the at least two options including at least one of: an option to proceed with the second transaction and cancel the first transaction; an option to proceed with the first transaction in place of the second transaction; or an option to proceed with the second transaction or a part of the second transaction in place of part of the first transaction.

In some embodiments, the input from a user via a graphical interface in respect of a first transaction comprises input to an e-commerce shop, and wherein attempting to execute an aspect of the first transaction by engaging a third party transaction service provider comprises engaging a third party installment payment service provider.

BRIEF DESCRIPTION OF THE DRAWINGS

Embodiments of the disclosure will now be described with reference to the attached drawings in which:

FIG. 6 is an example of a home page of an administrator, according to one embodiment.

DETAILED DESCRIPTION

For illustrative purposes, specific example embodiments will now be explained in greater detail below in conjunction with the figures.

Figure 1:
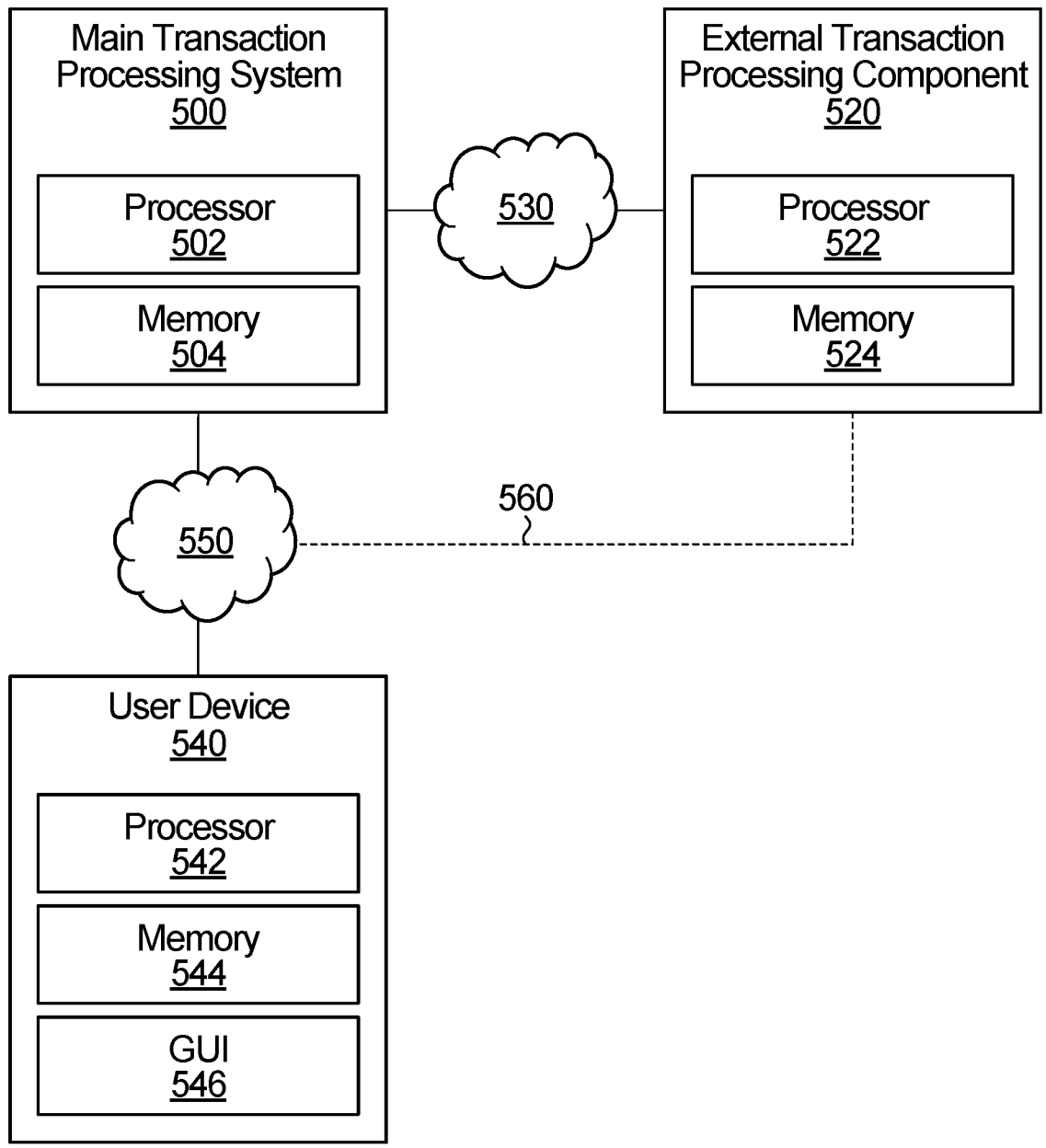
FIG. 1 is a block diagram of a transaction processing system provided by an embodiment of the disclosure.

Referring to FIG. 1, shown is a block diagram of a transaction processing system. The system includes a main transaction processing system 500 that delivers most of the functionality of the transaction processing system, and an external transaction processing component 520 that executes an aspect of transactions otherwise processed by the main transaction processing system 500. The external transaction processing component 520 may, for example, be associated with/provided by a third party transaction service provider. There may be multiple external transaction processing components that execute respect aspects of transactions. In the example illustrated, the main transaction processing system 500 includes a processor 502 and memory 504, and the external transaction processing component 520 also includes a processor 522 and memory 524.

The main transaction processing system 500 is in communication with the external transaction processing component 520, in the illustrated example via network 530. Also shown is a user device 540 for use by a user to interact with the main transaction processing system 500. In the illustrated example, the user device 540 includes a processor 542 and a memory 544 and has a graphical user interface (GUI) 546. The user device 540 is in communication with the main transaction processing system 500, for example via a network 550. Depending on transaction flow, a user device 540 may interact with the external transaction processing component 520 via a path that does not go through the transaction processing system 500, for example, via illustrated communication 552 via network 550. Of course, there could be multiple user devices 540.

Figure 2A:
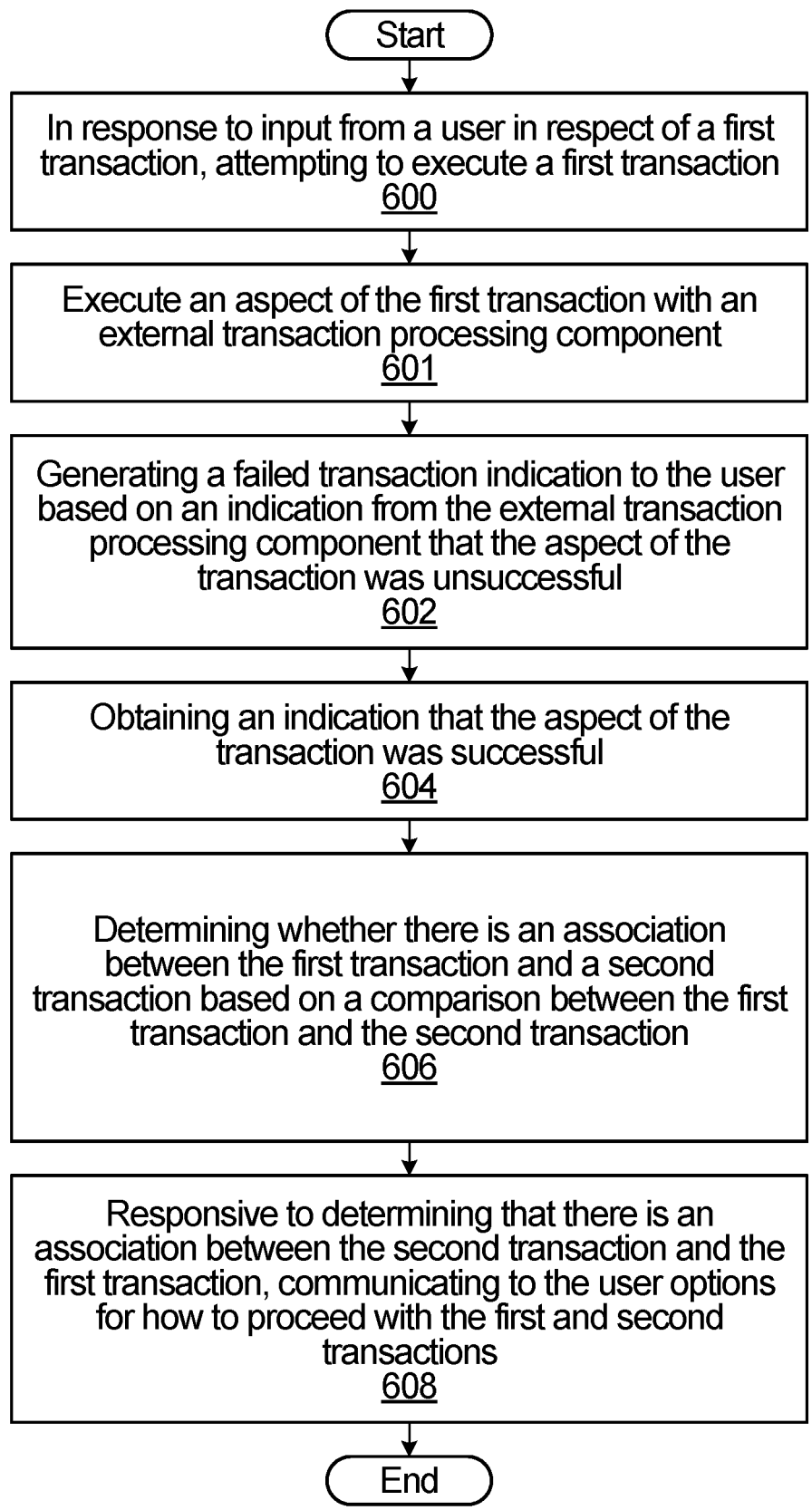
FIG. 2A is a flowchart of a method of transaction processing provided by an embodiment of the disclosure.

A method of transaction processing will now be described with reference to FIG. 2A. This method will be described as if it is executed by the system of FIG. 1, but that is not necessarily the case. In operation, at 600 a first transaction is executed using the main transaction processing system 500, typically based on, or in response to input from a user on user device 540 via the GUI 546. The first transaction for the most part is executed using the main transaction processing system 500. At 601, an aspect of the first transaction is executed with the external transaction processing component 520, for example a third party transaction service provider. The external transaction processing component 520 communicates with the main transaction processing system 500 in regards to the aspect of the first transaction, for example, providing a transaction processing result in the event of successful processing of the aspect of the first transaction, or a failure indication in the event of failure to successfully process the aspect of the first transaction. When the aspect of the first transaction is successfully completed by the external transaction processing component 520, the remainder of the first transaction can be completed by the main transaction processing system 500. When the aspect of the first transaction is not successfully completed by the external transaction processing component 520, and this has been indicated to the main transaction processing system 500, at 602, based on the failed transaction indication from the external transaction processing component, the main transaction processing system 500 generates a failed transaction indication to the user via the graphical user interface 546 on the user device 540. In addition, the main transaction processing system 500 marks the transaction as failed. This can involve extensive back and forth between the main transaction processing system 500 and the external transaction processing component to ensure that when processing is complete, the first transaction state is the same from the point of view of main transaction processing system 500 and the external transaction processing component 520. In a situation where there are many instances of this scenario, this can be a significant drain on system resources, and may affect overall system productivity. There is also an impact on the end user in that if the transaction had not been incorrectly reported as failed by the main transaction processing system 500, the end user would have been able to complete their original intended purchase.

At this point, from the perspective of the user, the first transaction has failed, and the user is free to attempt another transaction, which may be similar to or completely different from the one that failed. However, due to the distributed nature of the transaction processing system depicted, there can arise a situation where the indication of failure from the external transaction processing component is not correct; i.e. the aspect of the first transaction was in fact successful. At a later time (ideally very soon, as discussed below), at 604, the main transaction processing system 500 obtains an indication that the aspect or part of the aspect of the first transaction for which the external transaction processing component 520 was responsible for, was successful.

At this point, in some circumstances, the main transaction processing system 500 may inform the external transaction processing component 520 about the erroneous failure indication, in which case the external transaction processing component will reverse its aspect of the first transaction. However, in accordance with embodiments of the disclosure, steps are taken that may allow avoidance of the need to reverse all of the first transaction by the main transaction processing system 500 and the external transaction processing component 520.

On an ongoing basis, further transactions are processed by the main transaction processing system 500. At 606, the main transaction processing system 500 determines whether there is an association between the first transaction and a second transaction based on a comparison between the first transaction and the second transaction. Note in some embodiments, this association is identified before completion of the second transaction; this implies a time constraint on obtaining the indication that the aspect of the first transaction was successful after all. Examples of this comparison are provided below. The association is used to conclude that the second transaction is related to the first transaction in the sense that the user initiated the second transaction as a replacement for the ostensibly failed first transaction. At 608, responsive to determining that there is an association between the second transaction and the first transaction, the main transaction processing system 500 communicates to the user various options for how to proceed with the first and second transactions. The specifics of the options may vary by implementation. In a specific example, the options include at least one of:

- an option to proceed with the second transaction and to cancel the first transaction;
- an option to proceed with the first transaction in place of the second transaction;
- an option to proceed with the second transaction or a part of the second transaction in place of part of the first transaction.

In some embodiments, the main transaction processing platform is in control, for example through configuration input, of what options are presented to the user. In some embodiments, administrative input is sought to either approve, or select, or configure the options to be presented. This administrative input may apply on a per transaction basis, or may be set once, and used for transactions until the administrative input is changed.

The user can select, from the presented options, how they would like to proceed with the first and second transactions, and the system then processes the first and transactions based on the selected option. For the options presented above, this can involve the following:

- for the option to proceed with the second transaction and to cancel the first transaction, cancelling the first transaction, including communicating with the external transaction processing component 520 to reverse the aspect of the transaction that it was responsible for;
- for the option to proceed with the first transaction in place of the second transaction, there is no change to the first transaction; the main transaction processing system 500 updates its state information to reflect that the transaction was successful; the second transaction is cancelled;
- for the option to proceed with the second transaction or a part of the second transaction in place of part of the first transaction, this can involve modifying the first transaction to account for the fact that part of it has been replaced with the second transaction, and continuing with processing the second transaction.

Various approaches can be employed to obtain the indication that the aspect of the transaction was in fact successful. In some embodiments, this involves receiving a webhook (or other communication) from the external transaction processing component from which it can be determined that the aspect of the transaction was in fact successful. In some embodiments, obtaining the indication that the aspect of the transaction was in fact successful involves performing a reconciliation process. In some embodiments, this involves performing per-transaction reconciliation after each transaction. Alternatively, the reconciliation can be done batchwise on a periodic basis, such as daily, but superior performance may be achieved by executing the reconciliation on a per transaction basis as soon as possible. More specifically, there may be more options for saving a transaction, as detailed below, if reconciliation is done quickly. Alternatively, the system can rely on the receipt of a subsequent communication indicating success such as the above referenced web-hook. Reconciliation can result in the system changing the aspect of a transaction from unsuccessful to successful. But the failure of the transaction has already likely been reported to the user.

In some embodiments, the options for how to proceed with the transactions are sent to the user in an email or via another messaging platform. The email may include links associated with each of the options such that when the user clicks on one of the links, processing continues with that option.

In some embodiments, communicating to the user options for how to proceed with the first and second transactions involves communicating the options to the user via the graphical user interface before the user has completed the second transaction. This approach is the most efficient, in that the second transaction is not yet done, and the least number of changes will need to be made in order to proceed with the first transaction in place of the second transaction.

E-Commerce Embodiment

In some embodiments, the main transaction processing system is an E-commerce transaction processing system, for example, forming part of an E-commerce platform. In the course of transaction processing, a checkout object may be created; this may include information such as cart items, order date/time order cost etc. In this embodiment, the external transaction processing component may be a third party transaction service provider, for example a third party payment provider. Merchants may use a variety of payment providers to facilitate buyer transactions. A buyer may also be referred to as a customer. In some cases, merchants may provide the buyer with the option to choose a payment provider that allows payment for a product in installments. In this case the buyer initiates a loan agreement with the payment provider and the payment provider pays the merchant in full.

In this case, user input received via a graphical interface associated with the e-commerce platform may include user input to an e-commerce shop. The system executes an aspect of the transaction, namely a payment processing aspect, by engaging a third party transaction service provider in the form of a third party instalment payment service provider.

Occasionally, the payment provider's API may incorrectly return an indication that the payment processing aspect of a given transaction was unsuccessful when in actuality, it was completed successfully. In this case, a buyer who has confirmed payment at the checkout step may encounter an error screen; the buyer will be given the impression that the transaction was unsuccessful. The buyer believes the transaction has failed and is unaware that they have been charged or that the loan agreement with the payment provider was approved, authorized and executed; a loan in their name has actually been taken out.

A subsequent return to the checkout page may either present the buyer with a disabled button for the same payment method or result in a buyer retrying the same payment method and creating a second transaction that may be a duplicate of the first, or similar to the first. For example, if the payment transaction is incorrectly reported as a failure by the payment provider, the buyer may for example, 1) opt for a cheaper item that they can pay for in a single transaction by another payment method or 2) abandon the order altogether or 3) choose a different installments provider.

After some time, the payment provider may return a webhook or other indication that the purchase was successful. However, this information cannot be conveyed to the buyer, as it is received too late, well after a payment error page (or other indication of failure of the payment processing and/or of the transaction as a whole) has been displayed to the buyer and they have moved on. Until receipt of the webhook or other indication, the merchant is only aware of the second successful transaction and not the first transaction (reported as failed but actually successful).

For example, a first transaction may have incorrectly been reported as failed. The report is from the payment provider to the ecommerce platform. At this point the merchant does not receive an indication that an order has been placed. The buyer believes the order has failed and may abandon the transaction or take other options described above. After some time that is fully dependent on the external payment provider, a webhook is sent to the ecommerce platform that the first transaction was successful. However, at this point the platform will not associate it with an order and inform the merchant to fulfil it as the buyer may have abandoned this order. The merchant does not receive the webhook directly, the platform does. The platform may process the webhook and not inform the merchant in such a case.

Even if a buyer opts for a cheaper alternative which they can pay for in a single transaction, the merchant remains unaware of the original intended order in the first transaction. While some payment providers may have systems in place to detect and refund duplicate transactions i.e. detect the same amount charged twice in a short time period and refund the second charge, this only solves the problem of returning the buyers money. However, two additional problems remain: the buyer is left without the product they intended to purchase and the merchant remains unaware that they have lost a potential sale. Because the first order was recorded as a failed order, the merchant may never get notified that the order was created. The buyer believes the transaction failed and is unaware that they have been charged and the loan agreement with the payment provider was approved. Thus, there is a need for a robust solution that can address the above problems. The system and method described above with reference to FIGS. 1 and 2 can be adapted for application to such an e-commerce context.

A system and method are provided that 1) proactively checks for unreconciled payment transactions or relies upon indication of status or success from an external payment provider to identify unreconciled payment transactions, 2) detects that a second successful payment transaction is associated with a first unsuccessful payment transaction, and 3) provides the merchant and/or the buyer with relevant information to allow proactive steps to be taken to avoid the need to reverse the original transaction. In some cases, for example, where the second transaction is not yet complete and therefore does not need to be reversed in favour of the original transaction, the provided approach may save system resources, and improve system efficiency, and from the merchant's perspective may allow recovery of potentially lost sales opportunities.

Typically, when the payment provider incorrectly reports a transaction as unsuccessful, the e-commerce platform's records will log the transaction as unsuccessful. When the payment provider eventually registers the transaction as successful in their records, they may send a successful purchase webhook to the e-commerce platform. The webhook's payload can contain the same information as the checkout object during original transaction processing, i.e. cart items, order date/time order cost etc.

In some embodiments, the e-commerce platform's system is configured to run reconciliation jobs upon receipt of the webhook. The reconciliation job may determine that the transaction record stored on the e-commerce platform (unsuccessful transaction status) does not match the associated transaction contained in the webhook payload (successful transaction status).

Alternatively, rather than waiting for the payment provider to send a webhook, in some embodiments, the system is configured to proactively run reconciliation jobs by sending API requests at specified intervals to the payment provider. The requests may take as parameters any transaction ids in the system's database that do not have a successful purchase webhook from the payment provider associated with it, or more generally do not have a reconciliation result associated with it. The returned result will contain the correct status of the transaction i.e. successful/unsuccessful.

In some embodiments, the system then update its record of the transaction to match the payment provider's record; In this way, the system can continuously probe the payment provider's transaction records for transactions that have not been "double-checked". Once the transaction record is updated by the payment provider's response to the API call, the transaction can be considered reconciled.

In some embodiments, trigger events are defined that are used to control how to manage these types of failed transaction flows. In some embodiments, a first trigger event is considered to have occurred when the following criterion is satisfied:
  a reconciliation job causes a first transaction, incorrectly recorded with an unsuccessful status label, to change status to successful.

In some embodiments, a second trigger event is considered to have occurred when the following criterion is satisfied:
  the system identifies a second successful transaction made by the same buyer within a predefined interval after the first transaction that is associated with the first transaction.

Determining whether transactions are associated may involve, for example, analyzing cart contents in the relevant transactions and determining similarity and/or differences between the transactions, for example, in terms of items or costs between the first and second transactions.

In some embodiments, determining that transactions are associated transactions is performed using a set of predefined rules. For example, transactions can be determined to be associated if they include the same product titles, contain the same words, same products, same metatags etc.

In some embodiments, determining whether there is an association between the first transaction and the second transaction is based on a comparison between the first transaction and the second transaction and involves determining whether a product in an online shopping cart for the first transaction has a same function or a similar function as a product in an online shopping cart for the second transaction.

For example, in some embodiments, a machine learning (ML) model trained to detect similar items or similar functions of items is employed. For example, the model may be configured to predict the function "watching tv", for both products titles "50-inch Samsung OLED display" and "Sony 65" X95H 4K Ultra HD".

Figure 2B:
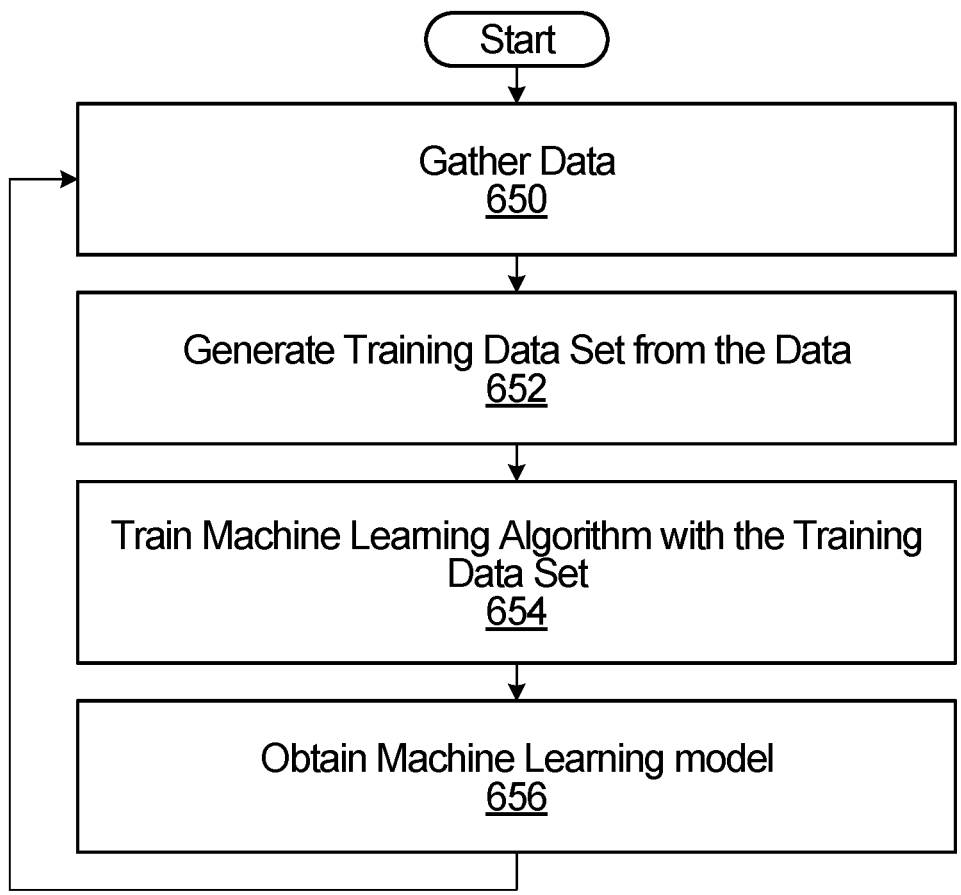
FIG. 2B is a flowchart of a method of generating a machine learning model for use in determining whether there is an association between transactions.

FIG. 2B is a flow diagram illustrating an example method to obtain a ML model. Block 650 includes gathering data. The data may be obtained from the e-commerce platform. For example, the data may be related to the products and include their titles, descriptions, SKUs and the like. In another example, the data may be related to past customer purchases or interactions on the e-commerce platform including search terms/keywords. In another example, the data may be obtained from the merchant back office and include product metadata and products that are often sold together. In another example, the data gathered may include the ads/search engine optimization that a store might be running for a given product; search terms/keywords being bid on will likely be the same/similar for related products.

Block 652 includes generating a training data set from the gathered data. Generating the training data may require the data to be cleaned and/or labeled. Cleaning the data may comprise removing noise (i.e. data with little to no information), formatting the data, and removing corrupt and/or duplicated data. For example, the product descriptions may have various preposition that may be removed from the data as they provide little to no information on the product.

Block 654 includes training the ML algorithm with the training data set. The methods of training a ML algorithm from a training data set can be grouped into supervised machine learning, unsupervised machine learning or a combination of both. Supervised machine learning is where the ML algorithm is provided with labeled training data sets that includes input and correct outputs that allow the ML model to learn over time until the desired level of accuracy is obtained. Unsupervised machine learning, on the other hand, is where the ML algorithm is provided with unlabeled training data sets and discovers hidden patterns or data groupings without human intervention.

Block 656 includes obtaining the ML model once the ML algorithm has been trained. Once obtained the ML model can determinations or predictions about the data, and in particular can be used to determine if there is an association between transactions. Blocks 650,652,654,656 may then be repeated to retrain to ML model.

In some embodiments, when the two trigger events have occurred, the system communicates to the buyer at least two options for how to proceed with the first and second transactions. The two options may, for example include one or both of:
  an option to proceed with the second transaction and cancel the first transaction; and
  an option to proceed with the first transaction in place of the second transaction.

In some embodiments, before the options are communicated to the buyer, the merchant is given the option of providing input/control over the options that are communicated to the buyer and/or whether options are communicated to the buyer. The merchant may be given the option of confirming or adjusting the options communicated to the buyer.

In some embodiments, a number of options may be available to a merchant to address relevant orders flagged by the system. In some embodiments, the system allows the merchant to configure their preferred approach to handling such orders, and the configured approach is executed each time. In other cases, the system may be configured to seek merchant input on a per transaction basis. Specific examples of such options are given below:
  1) Automate sending buyer a refund for the first transaction if incorrectly recorded as failed
  2) Rather than sending a refund first, automatically generate an email template for the merchant to use when contacting the buyer. The email template may include:
    an acknowledgement that the initial order was incorrectly reported as unsuccessful A list of items from the second order that may have been intended to replace items from the first order Actionable option buttons for the buyer to continue with the first transaction and request a refund of items in the second order that were intended to replace items in the first order.

3) Provide a notification to the buyer, either through a messaging platform such as email, that is separate from the normal transaction flow, or directly within transaction flow, such as checkout GUI, to proceed with the first transaction in place of the second transaction 4) In some embodiments, the second order may only be partially associated with the first order. For example, the second order may include a respective product that is similar to a corresponding product in the first order for one or more, possibly all, of the products in the first order, but the second order may include additional items not included in the first order. In some embodiments, this situation is identified, and the buyer is given the option (within the transaction flow or separately) of cancelling the second order in respect of the items for which similar items are in the first order, but the remainder of the second order for items not having similar items in the first order, is maintained. Again, this can be a configuration that is selected by the merchant.

5) Send a notification to the buyer through the GUI while still in the process of executing the second transaction, and before the second transaction is completed, letting the buyer know the first transaction was in fact successful, and giving them the option of keeping the first transaction, or cancelling it.

Figure 3A:
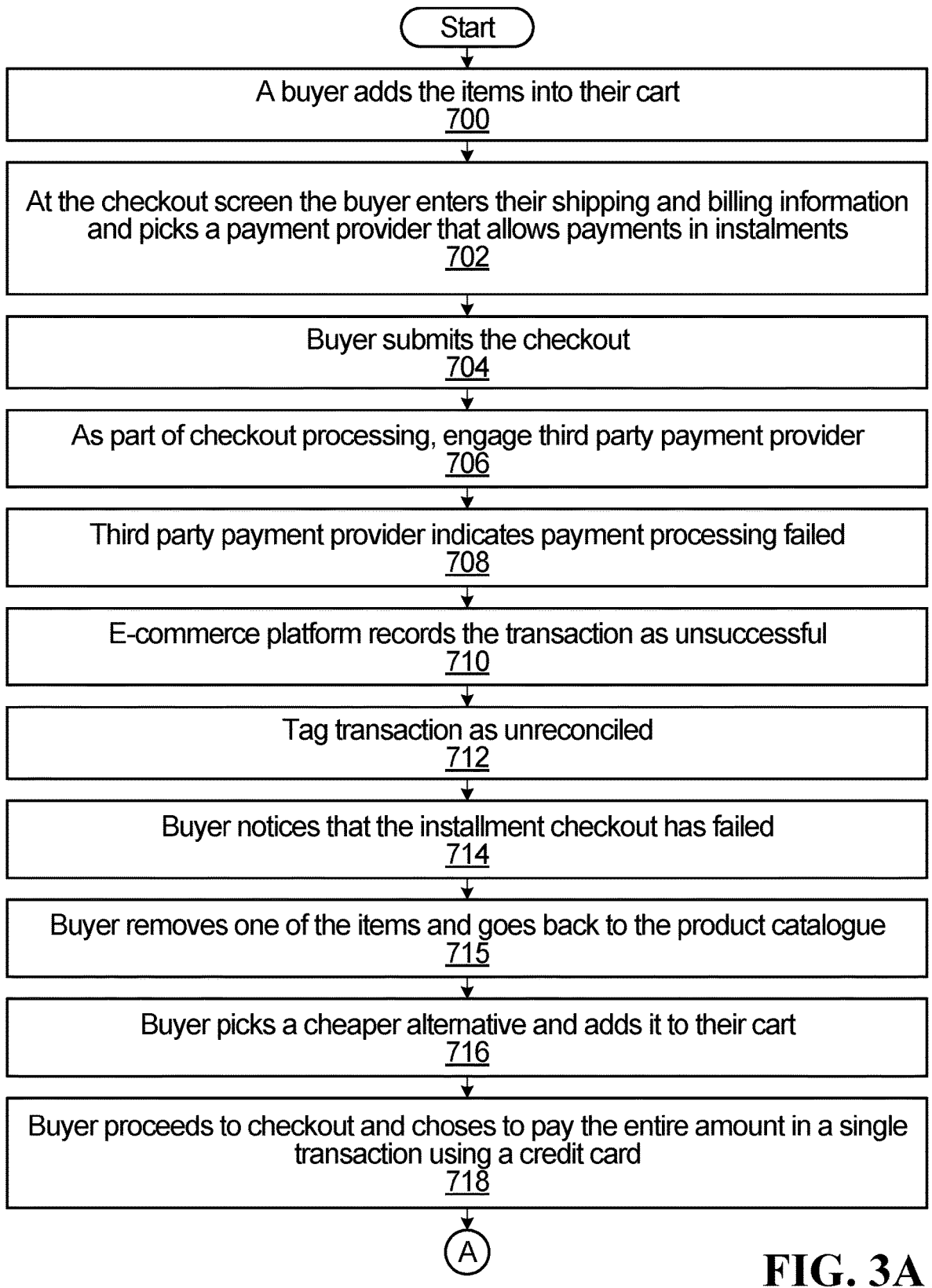
FIGS. 3A and 3B shows a specific example of a main transaction flow for an e-commerce related embodiment.
Figure 3B:
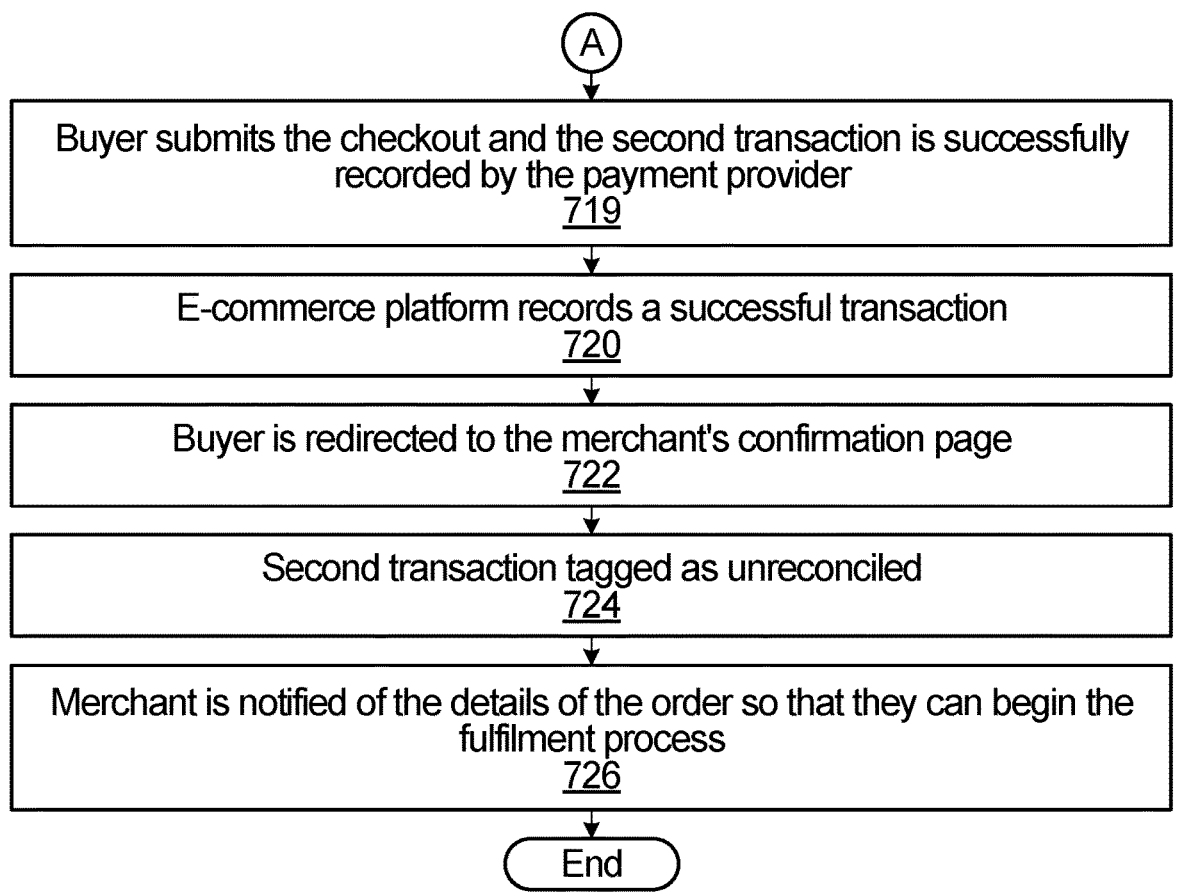

FIGS. 3A and 3B show a specific example of a main transaction flow for an e-commerce related embodiment. The transaction is assumed to have been assigned a transaction ID 001 by the e-commerce platform. At 700, a buyer adds items to their cart, e.g. item A, item B, and item C. At 702, on the checkout screen the buyer enters their shipping and billing information and picks a payment provider that allows payments in installments. At 704, the buyer submits the checkout. At 706, as part of checkout processing, a third party payment provider is engaged to execute payment processing. This can involve, for example, i. The loan agreement is approved by the payment provider ii. The first installment is charged to the buyer's account At 708, the payment provider returns an error indication to the platform. At 710, the e-commerce platform records the transaction (having ID 001) as unsuccessful. This is conveyed somehow to the buyer's device. This can involve an explicit indication that the payment step failed, or simply a redisplay of the previous page in the checkout flow, modified such that the installment payment option is no longer available. At 712, as the transaction has not been double checked yet, it is tagged as unreconciled by the e-commerce platform, or the unreconciled state could be inferred from other metadata.

At 714, the buyer notices that the installment checkout has failed, either due to receipt of an explicit message, or because having pressed the "back" button to reload the checkout page, the option to pay with installments is disabled, or not even present. At 715, the buyer removes one of the items, e.g. item A, from their cart and goes back to the product catalogue. At 716, the buyer picks a cheaper alternative item and adds it to their cart. For example, if item A was a fancy coffee machine, the replacement item may be a less expensive coffee machine. At 718, the buyer proceeds to checkout and choses to pay the entire amount in a single transaction using a credit card. At 719, the buyer submits the checkout and the second transaction (transaction ID 002) is successfully executed by the payment provider. At 720, the e-commerce platform records a successful transaction. At 722, the buyer is redirected to the merchant's confirmation page. At 724, as the second transaction has not been double checked against the payment provider's records yet, it will also be tagged as unreconciled by the e-commerce platform. At 726, the merchant is notified of the details of the second order so that they can begin the fulfilment process.

Figure 4:
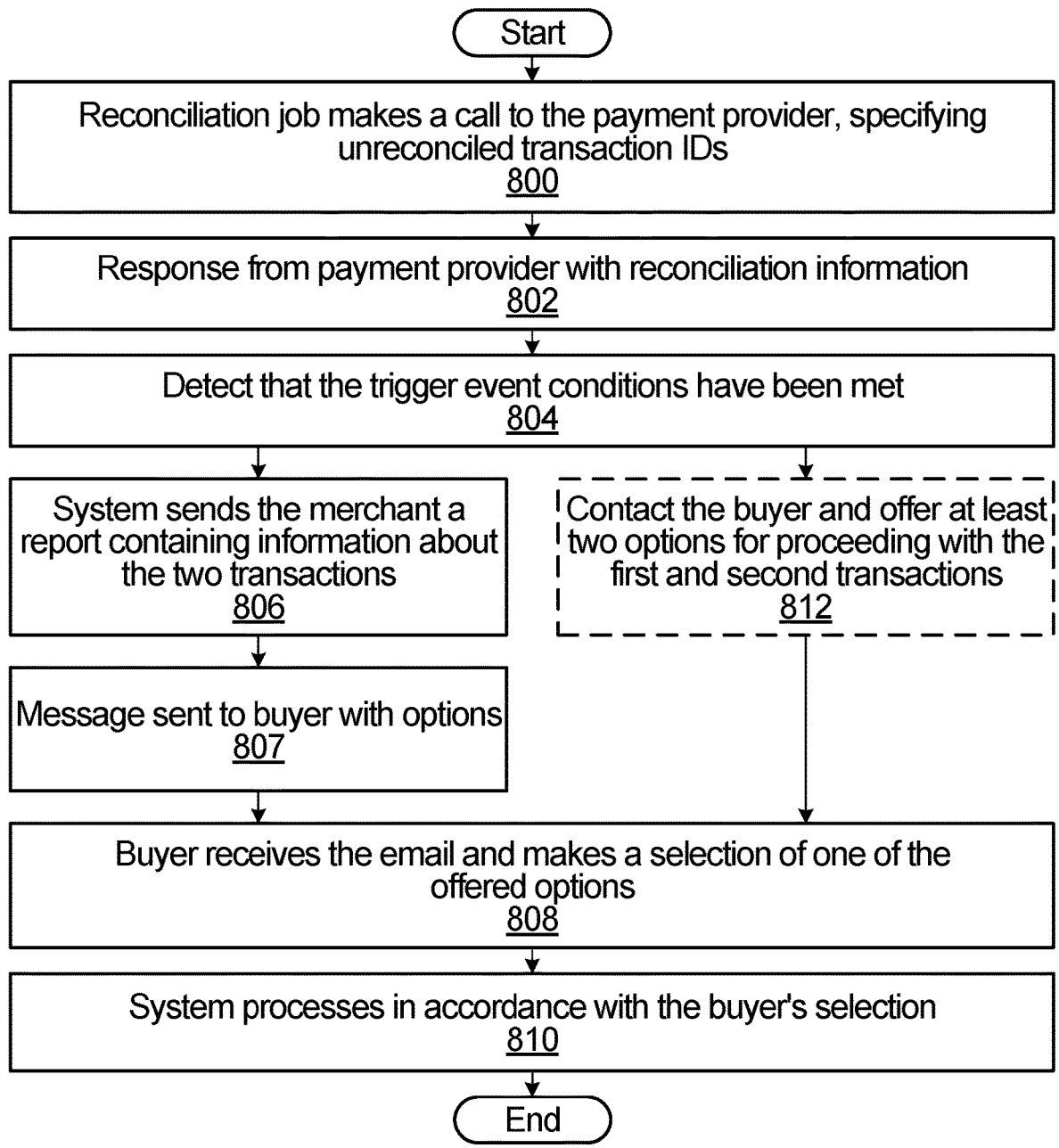
FIG. 4 shows a specific example of a reconciliation flow for an e-commerce related embodiment.

FIG. 4 shows an example of a reconciliation flow. This may, for example, be run periodically. The quicker that the reconciliation can be completed the better, as the options for addressing incorrectly recorded transactions are greater if done sooner. In some embodiments, reconciliation is performed on a per transaction basis following each transaction. At 800, a reconciliation job makes a call to the payment provider, specifying unreconciled transaction IDs 001 and 002. At 802, the response from the payment provider is received. In a specific example the following changes are made on the e-commerce platform's records:

Transaction ID 001 changes status from unsuccessful to successful. It is then marked as reconciled.

Transaction ID 002 has no status change as it has been recorded as successful by both the e-commerce platform and the payment provider. It is marked as reconciled.

At 804, the system detects that the trigger event conditions have been met: 1) transaction ID 001 has changed status from successful to unsuccessful 2) a successful transaction, transaction ID 002, is identified as being associated with the first transaction. This can involve, for example, determining that the second transaction occurred within a predefined interval from transaction 001, and determining an association between cart items in both transactions.

In some embodiments, this involves use of machine learning model to identify two products having the same function: item A in transaction ID 001 and the replacement item in transaction ID 002. A detailed example of this approach is presented above.

In some embodiments, this involves determining that product titles for items in transaction ID 001 and transaction ID 002 contain at least some common or similar wording. This can involve comparing the product titles of cart items to produce a metric that reflects the degree of similarity between the two titles. In a specific example, a parser first processes each title removing words that are not relevant to meaning (such as "a", "the" etc.). Each remaining word of a first title is compared to the words of the second title to see if there is a similar word. The words can be similar in that they are literally similar, like "refrigerate" and "refrigeration" or similar in meaning like "container" and "bucket". In some embodiments, a thesaurus either stored locally, or accessed over a network is used to determine similarity in meaning for two terms. Then, if the number of words that are similar is sufficient (for example based on a threshold that may vary depending on how many words are in the title with the fewer number of words) then it is determined that there is an association between the cart items.

At 806, the system sends the merchant a report containing information about the two transactions. In some embodiments, the report presents the merchant with the option to customize and edit a template email to the buyer. The template email may, for example, contain the following actionable buttons for the buyer:

iii. "Continue with original item A" i.e proceed with their first intended transaction.
iv. 'Continue with replacement item" i.e refund first transaction only.
v. Options for different payment methods i.e pay in installments or pay for the entire transaction with credit/debit card.

The merchant may customize their response. The message is sent to the buyer at 807. While email is given as the communications channel for this example, other channels may be used, and in some cases, the message may be conveyed through the e-commerce GUI.

At 808, the buyer receives the email (or other message) and makes a selection of one of the offered options, and at 810, the system processes in accordance with the buyer's selection.

An alternative flow following step 804 is also shown. In this flow, after the two trigger conditions are satisfied, the system contacts the buyer at 812 (either within the transaction flow, or via separate channel) and offers them at least two options for proceeding with the first and second transactions. This alternative flow does not involve merchant involvement in per transaction processing, however, the options that are provided may be based on prefiguration by the merchant as discussed previously. Following this step, the method continues with step 808 as described before.

In some embodiments, this reconciliation is complete, and the options are presented to the user, before completion of the second transaction. This offers an advantage in terms of available options and system efficiency compared to an embodiment where reconciliation is complete after completion of the second transaction, for example, in a system that runs checks only when it receives a webhook from the external payment provider.

An Example e-Commerce Platform

Although integration with a commerce platform is not required, in some embodiments, the methods disclosed herein may be performed on or in association with a commerce platform such as an e-commerce platform. Therefore, an example of a commerce platform will be described.

Figure 5:
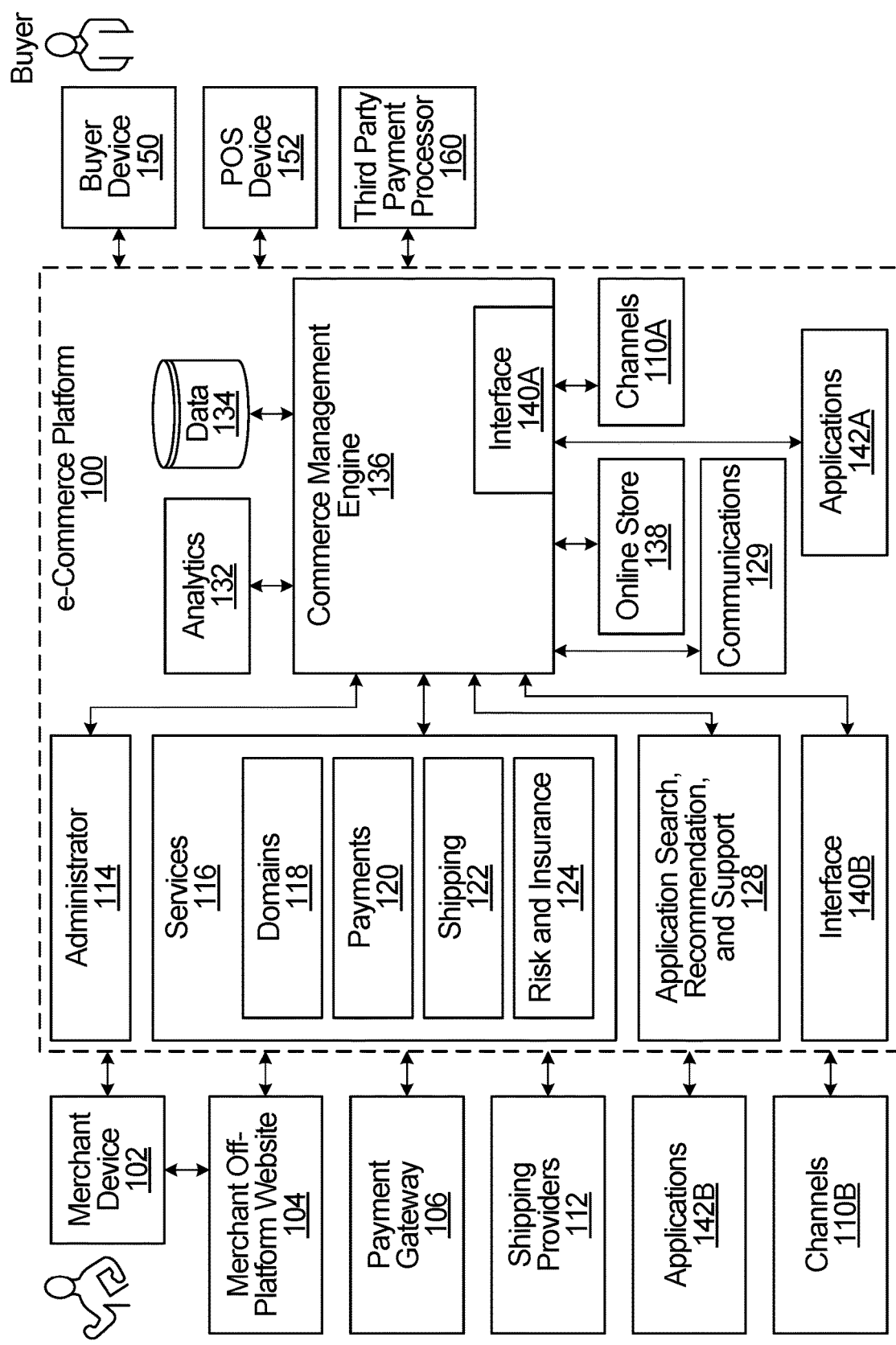
FIG. 5 is a block diagram of an e-commerce platform, according to one embodiment.

FIG. 5 illustrates an example e-commerce platform 100, according to one embodiment. The e-commerce platform 100 may be used to provide merchant products and services to buyers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'buyer' may be more than individuals, for simplicity the description herein may generally refer to merchants and buyers as such. All references to merchants and buyers throughout this disclosure should also be understood to be references to groups of individuals, companies, corporations, computing entities, and the like, and may represent for-profit or not-for-profit exchange of products. Further, while the disclosure throughout refers to 'merchants' and 'buyers', and describes their roles as such, the e-commerce platform 100 should be understood to more generally support users in an e-commerce environment, and all references to merchants and buyers throughout this disclosure should also be understood to be references to users, such as where a user is a merchant-user (e.g., a seller, retailer, wholesaler, or provider of products), a buyer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a buyer relations or buyer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a buyer) and that same or another associated device may be referred to accordingly (e.g., as a buyer device). For example, an individual may be a merchant for one type of product (e.g., shoes), and a buyer/consumer of other types of products (e.g., groceries). In another example, an individual may be both a consumer and a merchant of the same type of product. In a particular example, a merchant that trades in a particular category of goods may act as a buyer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 5, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with buyers, such as by implementing an e-commerce experience with buyers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with buyers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to buyers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a buyer may interact with the platform 100 through a buyer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach buyers through the online store 138, through applications 142A-B, through POS devices 152 in physical locations (e.g., a merchant's storefront or elsewhere), to communicate with buyers via electronic communication facility 129, and/or the like so as to provide a system for reaching buyers and facilitating merchant services for the real or virtual pathways available for reaching and interacting with buyers.

In some embodiments, and as described further herein, the e-commerce platform 100 may be implemented through a processing facility. Such a processing facility may include a processor and a memory. The processor may be a hardware processor. The memory may be and/or may include a transitory memory such as for example, random access memory (RAM), and/or a non-transitory memory such as, for example, a non-transitory computer readable medium such as, for example, persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, buyer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through buyer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a buyer device 150 (using data 134) such as, for example, through a network 420 connected to the e-commerce platform 100. For example, the online store 138 may serve or send content in response to requests for data 134 from the buyer device 150, where a browser (or other application) connects to the online store 138 through a network 420 using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to buyer devices and allow buyers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a buyer, shipping services 122 for providing buyer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their buyers such as, for example, shipping label or rate information, real-time delivery updates, tracking, and/or the like.

Also shown is a third party payment provider 160. As described above, the third party payment provider 160 may provide an installment payment option. The third party payment provider may feed back an incorrect indication to the commerce management engine that payment processing for a transaction failed, when in fact it was successful.

The commerce management engine 136, in one embodiment, is configured to perform one or more of the embodiments described above pertaining to identifying related transactions.

FIG. 6 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 6. Sections of the administrator 114 may include various interfaces for accessing and managing core aspects of a merchant's business, including orders, products, buyers, available reports and discounts. The administrator 114 may, additionally or alternatively, include interfaces for managing sales channels for a store including the online store 138, mobile application(s) made available to buyers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, buyer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent buyer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, buyers, merchant devices 102, buyer devices 150, POS devices 152, and the like, to aggregate and analyze the communications, such as for increasing sale conversions, and the like. For instance, a buyer may have a question related to a product, which may produce a dialog between the buyer and the merchant (or an automated processor-based agent/chatbot representing the merchant), where the communications facility 129 is configured to provide automated responses to buyer requests and/or provide recommendations to the merchant on how to respond such as, for example, to improve the probability of a sale.

The e-commerce platform 100 may provide a financial facility 120 for secure financial transactions with buyers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any buyer information indicative of a buyer, a buyer account or transactions carried out by a buyer such as. for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 5, in some embodiments the e-commerce platform 100 may include a commerce management engine 136 such as may be configured to perform various workflows for task automation or content management related to products, inventory, buyers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow buyers interacting with online stores 138 to have their payment information stored safely by the commerce management engine 136 such that they only have to enter it once. When a buyer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more buyers who checkout more often because of the ease of use with respect to buyer purchases. To maximize the effect of this network, payment information for a given buyer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., buyer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: buyer-facing applications, merchant-facing applications, integration applications, and the like. Buyer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with buyers in a flexible and transparent manner. A typical buyer experience may be better understood through an embodiment example purchase workflow, where the buyer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the buyer. If the buyer is not satisfied, they might return the products to the merchant.

In an example embodiment, a buyer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the buyer intends to buy. The shopping cart object may be channel specific and can be composed of multiple cart line items, where each cart line item tracks the quantity for a particular product variant. Since adding a product to a cart does not imply any commitment from the buyer or the merchant, and the expected lifespan of a cart may be in the order of minutes (not days), cart objects/data representing a cart may be persisted to an ephemeral data store.

The buyer then proceeds to checkout. A checkout object or page generated by the commerce management engine 136 may be configured to receive buyer information to complete the order such as the buyer's contact information, billing information and/or shipping details. If the buyer inputs their contact information but does not proceed to payment, the e-commerce platform 100 may (e.g., via an abandoned checkout component) to transmit a message to the buyer device 150 to encourage the buyer to complete the checkout. For those reasons, checkout objects can have much longer lifespans than cart objects (hours or even days) and may therefore be persisted. Buyers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the buyer where the merchant agrees to provide the goods and services listed on the order (e.g., order line items, shipping line items, and the like) and the buyer agrees to provide payment (including taxes). Once an order is created, an order confirmation notification may be sent to the buyer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and may track quantities for variants that have inventory tracking enabled. It may decouple product variants (a buyer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the buyer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the buyer is partially or fully returned; an accounting adjustment noting how much money was refunded (e.g., including if there was any restocking fees or goods that weren't returned and remain in the buyer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Numerous modifications and variations of the present disclosure are possible in light of the above teachings. It is therefore to be understood that within the scope of the appended claims, the disclosure may be practiced otherwise than as specifically described herein.

The invention claimed is:

1. A processor implemented method comprising:
   in response to input from a user via a graphical interface in respect of a first transaction, attempting to execute an aspect of the first transaction with a third party transaction service provider;
   generating a failed transaction indication to the user via the graphical user interface based on a first indication from the third party transaction service provider that the aspect of the transaction was unsuccessful;
   obtaining a second indication that the aspect of the transaction was successful, wherein one of the first indication and the second indication are erroneous;
   determining whether there is an association between the first transaction and a second transaction based on a comparison between the first transaction and the second transaction, wherein the first transaction and the second transaction were attempted at different times; and
   upon determining that there is an association between the second transaction and the first transaction, communicating to the user options for how to proceed with the first and second transactions, the options including at least one of:
   an option to proceed with the second transaction and cancel the first transaction;
   an option to proceed with the first transaction in place of the second transaction; or
   an option to proceed with the second transaction or a part of the second transaction in place of part of the first transaction.

2. The method of claim 1 wherein obtaining an indication that the aspect of the transaction was in fact successful comprises receiving a web-hook from which it can be determined that the aspect of the transaction was in fact successful.

3. The method of claim 1 wherein obtaining an indication that the aspect of the transaction was in fact successful comprises performing a reconciliation process.

4. The method of claim 1 wherein the input from a user via a graphical interface in respect of a first transaction comprises input to an e-commerce shop, and wherein attempting to execute an aspect of the first transaction by engaging a third party transaction service provider comprises engaging a third party installment payment service provider.

5. The method of claim 4 wherein determining whether there is an association between the first transaction and the second transaction based on a comparison between the first transaction and the second transaction comprises determining whether a product in an online shopping cart for the first transaction has a same function or a similar function as a product in an online shopping cart for the second transaction.

6. The method of claim 4 wherein communicating to the user at least two options for how to proceed with the first and second transactions comprises communicating the options to the user via the graphical user interface before the user has completed the second transaction.

7. The method of claim 4 wherein determining that the aspect of the transaction was in fact successful comprises performing a per-transaction reconciliation after each transaction.

8. The method of claim 4 wherein communicating to the user at least two options for how to proceed with the first and second transactions comprises communicating the options to the user via an email or another messaging platform that is independent of the graphical user interface.

9. The method of claim 6 further comprising:
   prior to communicating the at least two options to the user, communicating the options to a merchant account associated with the online shop, for confirmation or adjustment.

10. A system for processing transactions, the system comprising:
    memory including item listing information and information identifying users;
    a processor configured control the system to:
       in response to input from a user via a graphical interface in respect of a first transaction, attempt to execute an aspect of the first transaction with a third party transaction service provider;
       generate a failed transaction indication to the user via the graphical user interface based on a first indication from the third party transaction service provider that the aspect of the transaction was unsuccessful;
       obtain a second indication that the aspect of the transaction was successful, wherein one of the first indication and the second indication are erroneous;
       determine whether there is an association between the first transaction and a second transaction based on a comparison between the first transaction and the second transaction, wherein the first transaction and the second transaction were attempted at different times; and responsive to determining that there is an association between the second transaction and the first transaction, communicate to the user options for how to proceed with the first and second transactions, the options including at least one of:

an option to proceed with the second transaction and cancel the first transaction;

an option to proceed with the first transaction in place of the second transaction; or an option to proceed with the second transaction or a part of the second transaction in place of part of the first transaction.

11. The system of claim 10 wherein obtaining an indication that the aspect of the transaction was in fact successful comprises receiving a web-hook from which it can be determined that the aspect of the transaction was in fact successful.

12. The system of claim 10 wherein obtaining an indication that the aspect of the transaction was in fact successful comprises performing a reconciliation process.

13. The system of claim 10 wherein the input from a user via a graphical interface in respect of a first transaction comprises input to an e-commerce shop, and wherein attempting to execute an aspect of the first transaction by engaging a third party transaction service provider comprises engaging a third party installment payment service provider.

14. The system of claim 13 wherein determining whether there is an association between the first transaction and the second transaction based on a comparison between the first transaction and the second transaction comprises determining whether a product in an online shopping cart for the first transaction has a same function or a similar function as a product in an online shopping cart for the second transaction.

15. The system of claim 13 wherein communicating to the user at least two options for how to proceed with the first and second transactions comprises communicating the options to the user via the graphical user interface before the user has completed the second transaction.

16. The system of claim 13 wherein determining that the aspect of the transaction was in fact successful comprises performing a per-transaction reconciliation after each transaction.

17. The system of claim 13 wherein communicating to the user at least two options for how to proceed with the first and second transactions comprises communicating the options to the user via an email or another messaging platform that is independent of the graphical user interface.

18. The system of claim 15 further comprising:

prior to communicating the at least two options to the user, communicating the options to a merchant account associated with the online shop, for confirmation or adjustment.

19. A non-transitory computer readable medium including processor executable instructions which, when executed by a processor cause the processor to control a system to:

in response to input from a user via a graphical interface in respect of a first transaction, attempt to execute an aspect of the first transaction with a third party transaction service provider;

generate a failed transaction indication to the user via the graphical user interface based on a first indication from the third party transaction service provider that the aspect of the transaction was unsuccessful;

obtain a second indication that the aspect of the transaction was successful, wherein one of the first indication and the second indication are erroneous;

determine whether there is an association between the first transaction and a second transaction based on a comparison between the first transaction and the second transaction, wherein the first transaction and the second transaction were attempted at different times; and responsive to that there is an association between the second transaction and the first transaction, communicate to the user options for how to proceed with the first and second transactions, the options including at least one of:

an option to proceed with the second transaction and cancel the first transaction;

an option to proceed with the first transaction in place of the second transaction; or an option to proceed with the second transaction or a part of the second transaction in place of part of the first transaction.

20. The non-transitory computer readable medium of claim 19 wherein the input from a user via a graphical interface in respect of a first transaction comprises input to an e-commerce shop, and wherein attempting to execute an aspect of the first transaction by engaging a third party transaction service provider comprises engaging a third party installment payment service provider.

* * * * *